United States Patent
Wagner et al.

(10) Patent No.: US 11,560,235 B2
(45) Date of Patent: Jan. 24, 2023

(54) AIRCRAFT PROPULSION UNIT

(71) Applicant: Joby Aero, Inc., Santa Cruz, CA (US)

(72) Inventors: Jonathan Wagner, Santa Cruz, CA (US); Bradley Landseadel, Santa Cruz, CA (US); Joey Milia, Santa Cruz, CA (US); Scott MacAfee, Santa Cruz, CA (US); Martin van der Geest, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 17/650,458

(22) Filed: Feb. 9, 2022

(65) Prior Publication Data
US 2022/0250756 A1     Aug. 11, 2022

Related U.S. Application Data

(60) Provisional application No. 63/147,560, filed on Feb. 9, 2021.

(51) Int. Cl.
*B64D 27/24* (2006.01)
*B64D 33/08* (2006.01)

(52) U.S. Cl.
CPC ............. *B64D 27/24* (2013.01); *B64D 33/08* (2013.01)

(58) Field of Classification Search
CPC ..... B64D 27/24; B64D 33/08; B60L 2210/40; B60L 2240/425; B60L 15/007; B60L 2200/10; B60L 2240/525; H02K 9/19; H02K 11/33; Y02T 50/40; Y02T 50/60
See application file for complete search history.

(56) References Cited

U.S. PATENT DOCUMENTS

| | | | | |
|---|---|---|---|---|
| 5,535,967 A | * | 7/1996 | Beauchamp | B64C 21/06 244/209 |
| 6,390,418 B1 | * | 5/2002 | McCormick | B64C 23/00 244/1 N |
| 8,016,226 B1 | * | 9/2011 | Wood | B64C 29/0033 244/23 B |
| 8,152,096 B2 | * | 4/2012 | Smith | B64C 29/0033 244/12.4 |

(Continued)

FOREIGN PATENT DOCUMENTS

| | | |
|---|---|---|
| DE | 19543284 A1 | 5/1997 |
| DE | 102018129226 | 5/2020 |

(Continued)

OTHER PUBLICATIONS

"Machine Translation of DE 102018129226".

(Continued)

*Primary Examiner* — Medhat Badawi
(74) *Attorney, Agent, or Firm* — Schwegman Lundberg & Woessner, P.A.

(57) ABSTRACT

An aircraft propulsion unit includes an electric motor, at least one accessory unit used for operating the electric motor, an inverter module, the inverter module including a plurality of inverters for powering the electric motor and the at least one accessory unit, and a cooling system coupled to the electric motor and the inverter module, the cooling system comprising a coolant path for circulating a coolant through or adjacent to the electric motor and the at least one accessory unit.

17 Claims, 9 Drawing Sheets

(56) References Cited

U.S. PATENT DOCUMENTS

| | | | | |
|---|---|---|---|---|
| 8,485,464 B2* | 7/2013 | Kroo | B64C 29/0025 | 244/6 |
| 8,708,273 B2* | 4/2014 | Oliver | B64D 27/12 | 244/66 |
| 8,998,125 B2* | 4/2015 | Hollimon | B64C 29/0033 | 244/6 |
| 9,102,401 B2* | 8/2015 | Collins | B64C 29/0033 | |
| 9,128,109 B1* | 9/2015 | O'Neill | G01P 21/02 | |
| 9,435,661 B2* | 9/2016 | Brenner | G05D 1/0808 | |
| 9,561,857 B2* | 2/2017 | Weber | B64D 37/34 | |
| 9,771,157 B2* | 9/2017 | Gagne | B64D 41/00 | |
| 9,944,386 B1* | 4/2018 | Reichert | B64C 25/54 | |
| 10,144,503 B1* | 12/2018 | Vander Lind | B64C 29/0025 | |
| 10,183,746 B2* | 1/2019 | McCullough | B64D 25/12 | |
| 10,208,676 B2* | 2/2019 | Johnson | F01D 17/105 | |
| 10,246,184 B2* | 4/2019 | Ragland | B64C 29/0025 | |
| 10,247,100 B2* | 4/2019 | Leamy | F01D 13/02 | |
| 10,407,164 B2* | 9/2019 | Blumer | B64D 15/04 | |
| 10,497,996 B1* | 12/2019 | Muniz | B60L 58/24 | |
| 10,608,505 B1* | 3/2020 | Long | H02K 15/14 | |
| 10,780,786 B2* | 9/2020 | Del Core | B60L 8/006 | |
| 11,161,589 B2* | 11/2021 | Bevirt | B64C 23/005 | |
| 11,247,583 B2* | 2/2022 | Bellino | H01M 10/613 | |
| 11,271,455 B2* | 3/2022 | Teofili | H02K 9/06 | |
| 11,387,709 B2* | 7/2022 | Klein | B60K 11/06 | |
| 2011/0109100 A1 | 5/2011 | Versteegh | H02K 9/04 | 290/55 |
| 2011/0147533 A1* | 6/2011 | Goossen | B64C 11/001 | 415/13 |
| 2012/0025016 A1* | 2/2012 | Methven | B64C 11/00 | 244/65 |
| 2012/0061526 A1* | 3/2012 | Brunken, Jr. | B64C 27/10 | 244/17.11 |
| 2012/0091257 A1* | 4/2012 | Wolff | B64C 29/0033 | 244/12.4 |
| 2012/0234968 A1* | 9/2012 | Smith | B64D 17/64 | 244/12.3 |
| 2013/0270937 A1* | 10/2013 | Rasmussen | F03D 80/60 | 290/55 |
| 2015/0102659 A1* | 4/2015 | Liffring | B60R 16/03 | 307/9.1 |
| 2015/0136897 A1* | 5/2015 | Seibel | B64C 39/024 | 244/6 |
| 2015/0188367 A1* | 7/2015 | Vander Lind | F03D 1/02 | 290/55 |
| 2015/0232178 A1* | 8/2015 | Reiter | B64C 3/385 | 244/7 A |
| 2015/0259060 A1* | 9/2015 | Khorrami | B64C 1/40 | 244/1 N |
| 2015/0266571 A1* | 9/2015 | Bevirt | B64C 11/28 | 244/7 C |
| 2015/0360794 A1* | 12/2015 | Certain | G01P 5/00 | 701/14 |
| 2016/0031555 A1* | 2/2016 | Bevirt | B64C 27/08 | 244/7 C |
| 2016/0031556 A1* | 2/2016 | Bevirt | B64D 27/24 | 416/131 |
| 2016/0144957 A1* | 5/2016 | Claridge | B64C 39/024 | 244/6 |
| 2016/0204488 A1* | 7/2016 | Arai | B60H 1/00278 | 429/62 |
| 2016/0272312 A1* | 9/2016 | Mallard | B64C 29/0033 | |
| 2016/0304194 A1* | 10/2016 | Bevirt | B64C 27/08 | |
| 2016/0325841 A1* | 11/2016 | Beckman | B60H 1/00564 | |
| 2017/0101176 A1* | 4/2017 | Alber | B64C 3/32 | |
| 2017/0104385 A1* | 4/2017 | Salamon | B64C 11/12 | |
| 2017/0104426 A1* | 4/2017 | Mills | C25B 1/04 | |
| 2017/0137132 A1* | 5/2017 | Wiegers | B64D 13/06 | |
| 2017/0203839 A1* | 7/2017 | Giannini | B64C 29/0033 | |
| 2017/0247126 A1* | 8/2017 | Blanding | B64C 3/187 | |
| 2017/0274983 A1* | 9/2017 | Beckman | B64C 11/28 | |
| 2017/0297431 A1* | 10/2017 | Epstein | F02N 19/10 | |
| 2017/0314416 A1* | 11/2017 | Sharma | F01D 25/14 | |
| 2017/0349053 A1* | 12/2017 | Landseadel | H02J 7/02 | |
| 2018/0105279 A1* | 4/2018 | Tighe | B64D 27/24 | |
| 2018/0115029 A1* | 4/2018 | Ren | H01M 10/63 | |
| 2018/0134400 A1* | 5/2018 | Knapp | B64C 11/001 | |
| 2018/0138761 A1* | 5/2018 | Niergarth | H02K 1/187 | |
| 2018/0138766 A1* | 5/2018 | Moore | B64D 27/24 | |
| 2018/0148182 A1* | 5/2018 | Fagundes | B64D 13/06 | |
| 2018/0183657 A1* | 6/2018 | Beilin | H04L 43/10 | |
| 2018/0215475 A1* | 8/2018 | Hurt | B64D 13/08 | |
| 2018/0237148 A1* | 8/2018 | Hehn | B64C 39/024 | |
| 2018/0244370 A1* | 8/2018 | Lombard | B64C 23/076 | |
| 2018/0251226 A1* | 9/2018 | Fenny | B64C 29/0033 | |
| 2018/0287234 A1* | 10/2018 | Melack | H01M 10/625 | |
| 2018/0290736 A1* | 10/2018 | Mikic | B64C 27/08 | |
| 2018/0358664 A1* | 12/2018 | Zhang | H01M 10/6561 | |
| 2018/0362166 A1* | 12/2018 | Marr | B64D 13/06 | |
| 2019/0077219 A1* | 3/2019 | Frieling | B64D 13/06 | |
| 2019/0210740 A1* | 7/2019 | Luo | G01S 19/13 | |
| 2019/0214161 A1* | 7/2019 | Chen | B60L 53/22 | |
| 2019/0312439 A1* | 10/2019 | Cottrell | B64D 31/14 | |
| 2019/0316849 A1* | 10/2019 | Mendez Abrego | B60K 11/02 | |
| 2019/0329859 A1* | 10/2019 | Bevirt | B64D 29/02 | |
| 2019/0341659 A1* | 11/2019 | Terwilliger | H01M 10/625 | |
| 2019/0351740 A1* | 11/2019 | Filipkowski | B60H 1/32284 | |
| 2020/0002828 A1* | 1/2020 | Mills | H01L 31/0735 | |
| 2020/0025884 A1* | 1/2020 | Sugita | G01S 7/4816 | |
| 2020/0070989 A1* | 3/2020 | Harvey | B64C 11/001 | |
| 2020/0140094 A1* | 5/2020 | White | F28F 27/00 | |
| 2020/0207477 A1* | 7/2020 | Ghesquiere | B64D 27/24 | |
| 2020/0339010 A1* | 10/2020 | Villanueva | H01M 10/6568 | |
| 2020/0350648 A1* | 11/2020 | Rheaume | H01M 10/6563 | |
| 2020/0355121 A1* | 11/2020 | O'Meallie | F02C 9/18 | |
| 2020/0376927 A1* | 12/2020 | Rajaie | B60H 1/00764 | |
| 2020/0381985 A1 | 12/2020 | Sercombe et al. | | |
| 2020/0382041 A1* | 12/2020 | Abdelli | H02K 16/00 | |
| 2020/0385127 A1* | 12/2020 | Devault | B64D 13/08 | |
| 2020/0385139 A1 | 12/2020 | Verna et al. | | |
| 2021/0162884 A1* | 6/2021 | Villanueva | B64F 1/36 | |
| 2021/0170908 A1* | 6/2021 | Villanueva | H01M 50/249 | |
| 2021/0351670 A1* | 11/2021 | Saber | H02K 5/203 | |
| 2021/0351712 A1* | 11/2021 | Landseadel | H02M 3/33584 | |
| 2022/0011782 A1* | 1/2022 | Mikic | B64C 29/0033 | |
| 2022/0250756 A1* | 8/2022 | Wagner | B60L 15/007 | |

FOREIGN PATENT DOCUMENTS

| | | |
|---|---|---|
| EP | 2774853 A1 | 9/2014 |
| EP | 3214735 | 9/2017 |
| WO | WO-2020025884 A1 | 2/2020 |
| WO | 2020191167 | 9/2020 |

OTHER PUBLICATIONS

Dubois, Arthur, "Design of an Electric Propulsion System for SCEPTOR", Aviation Technology, Integration, and Operations Conference, Washington, DC, (Jun. 13, 2016).

"International Application Serial No. PCT/US2022/070585, International Search Report dated May 10, 2022", 5 pgs.

"International Application Serial No. PCT/US2022/070585, Written Opinion dated May 10, 2022", 5 pgs.

* cited by examiner

AIRCRAFT PROPULSION UNIT

RELATED APPLICATION DATA

This application claims the benefit of U.S. Application Ser. No. 63/147,560 filed Feb. 9, 2021, the contents of which are incorporated herein by reference as if explicitly set forth.

TECHNICAL FIELD

This invention relates generally to the aviation field, and more specifically to the packaging or cooling of an aircraft propulsion system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The following description of some examples of the invention is not intended to limit the invention to these examples, but rather to enable any person skilled in the art to make and use this invention.

Figure 1:
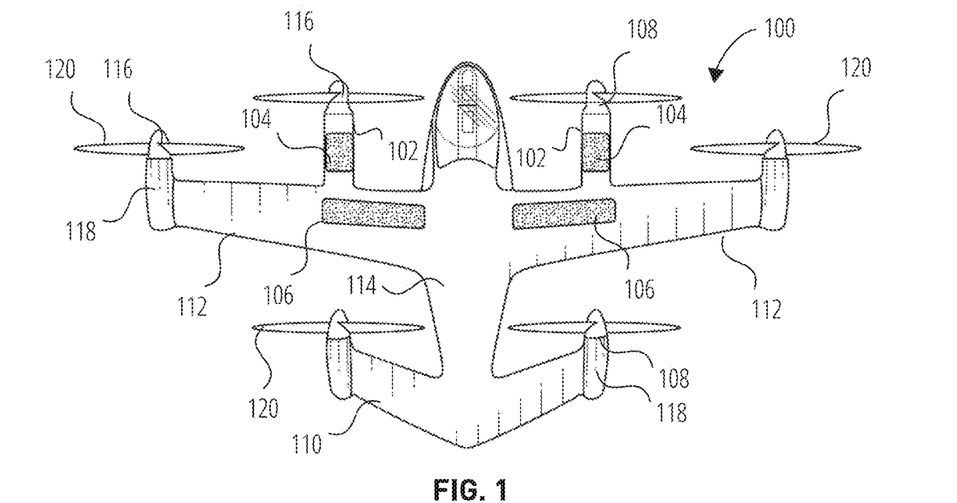
FIG. 1 is a plan view of an aircraft according to some examples.

FIG. 1 is a plan view of an aircraft 100. The aircraft 100 includes a fuselage 114, two wings 112, an empennage 110 and propulsion systems 108 embodied as tiltable rotor assemblies 116 located in nacelles 118. The aircraft 100 includes one or more power sources embodied in FIG. 1 as nacelle battery packs 104 and wing battery packs 106. In the illustrated example, the nacelle battery packs 104 are located in inboard nacelles 102, but of course it will be appreciated that the nacelle battery packs 104 could be located in other nacelles 118 forming part of the aircraft 100. The battery packs form part of the energy system 200 described with reference to FIG. 2. The aircraft 100 will typically include associated equipment such as an electronic infrastructure, control surfaces, a cooling system, landing gear and so forth.

The wings 112 function to generate lift to support the aircraft 100 during forward flight. The wings 112 can additionally or alternately function to structurally support the battery packs 202, battery module 204 and/or propulsion systems 108 under the influence of various structural stresses (e.g., aerodynamic forces, gravitational forces, propulsive forces, external point loads, distributed loads, and/or body forces, etc.). The wings 112 can have any suitable geometry and/or arrangement on the aircraft.

Figure 2:
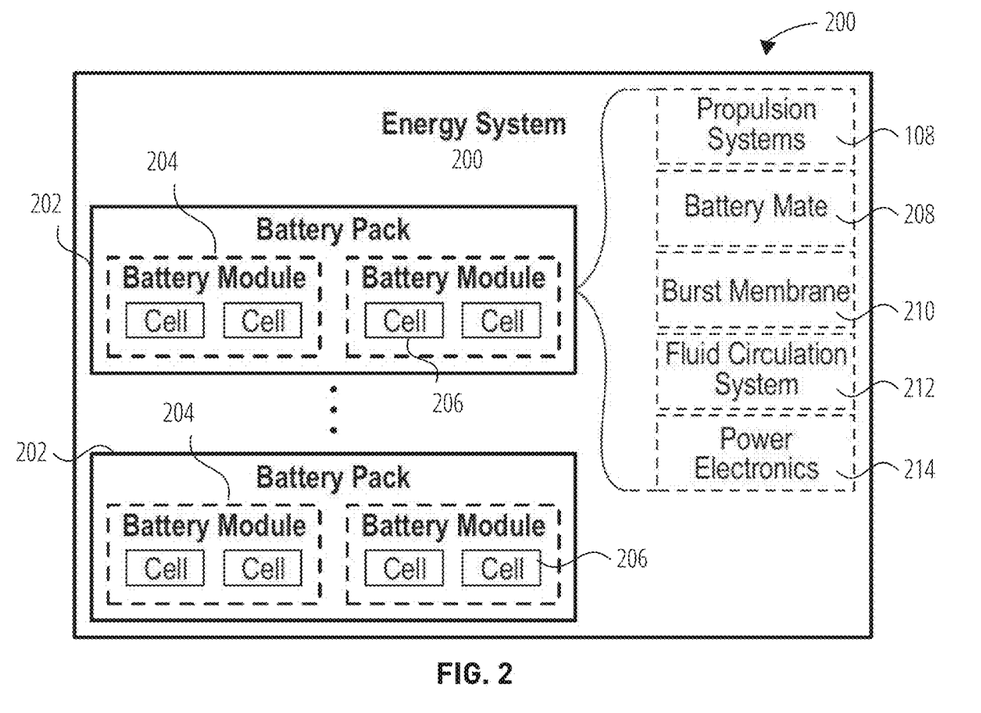
FIG. 2 is a schematic view of an aircraft energy system for use in the aircraft of FIG. 1, according to some examples.

FIG. 2 is a schematic view of an aircraft energy system 200 for use in the aircraft 100 of FIG. 1, according to some examples. As shown, the energy system 200 includes one or more battery packs 202. Each battery pack 202 may include one or more battery modules 204, which in turn may comprise a number of cells 206.

Typically associated with a battery pack 202 are one or more electric propulsion systems 108, a battery mate 208 for connecting it to other components in energy system 200, a burst membrane 210 as part of a venting system, a fluid circulation system 212 for cooling, and power electronics 214 for regulating delivery of electrical power (from the battery during operation and to the battery during charging) and to provide integration of the battery pack 202 with the electronic infrastructure of the energy system 200. As shown in FIG. 1, the propulsion systems 108 may comprise a plurality of rotor assemblies.

The electronic infrastructure and the power electronics 214 can additionally or alternatively function to integrate the battery packs 202 into the energy system of the aircraft. The electronic infrastructure can include a Battery Management System (BMS), power electronics (HV architecture, power components, etc.), LV architecture (e.g., vehicle wire harness, data connections, etc.), and/or any other suitable components. The electronic infrastructure can include intermodule electrical connections, which can transmit power and/or data between battery packs and/or modules. Intermodules can include bulkhead connections, bus bars, wire harnessing, and/or any other suitable components.

The battery packs 202 function to store electrochemical energy in a rechargeable manner for supply to the propulsion systems 108. Battery packs 202 can be arranged and/or distributed about the aircraft in any suitable manner. Battery packs can be arranged within wings (e.g., inside of an airfoil cavity), inside nacelles, and/or in any other suitable location on the aircraft. In a specific example, the system includes a first battery pack within an inboard portion of a left wing and a second battery pack within an inboard portion of a right wing. In a second specific example, the system includes a first battery pack within an inboard nacelle of a left wing and a second battery pack within an inboard nacelle of a right wing. Battery packs 202 may include a plurality of battery modules 204.

The energy system 200 includes a cooling system (e.g. fluid circulation system 212) that functions to circulate a working fluid within the battery pack 202 to remove heat generated by the battery pack 202 during operation or charging. Battery cells 206, battery module 204 and/or battery packs 202 can be fluidly connected by the cooling system in series and/or parallel in any suitable manner.

Figure 3:
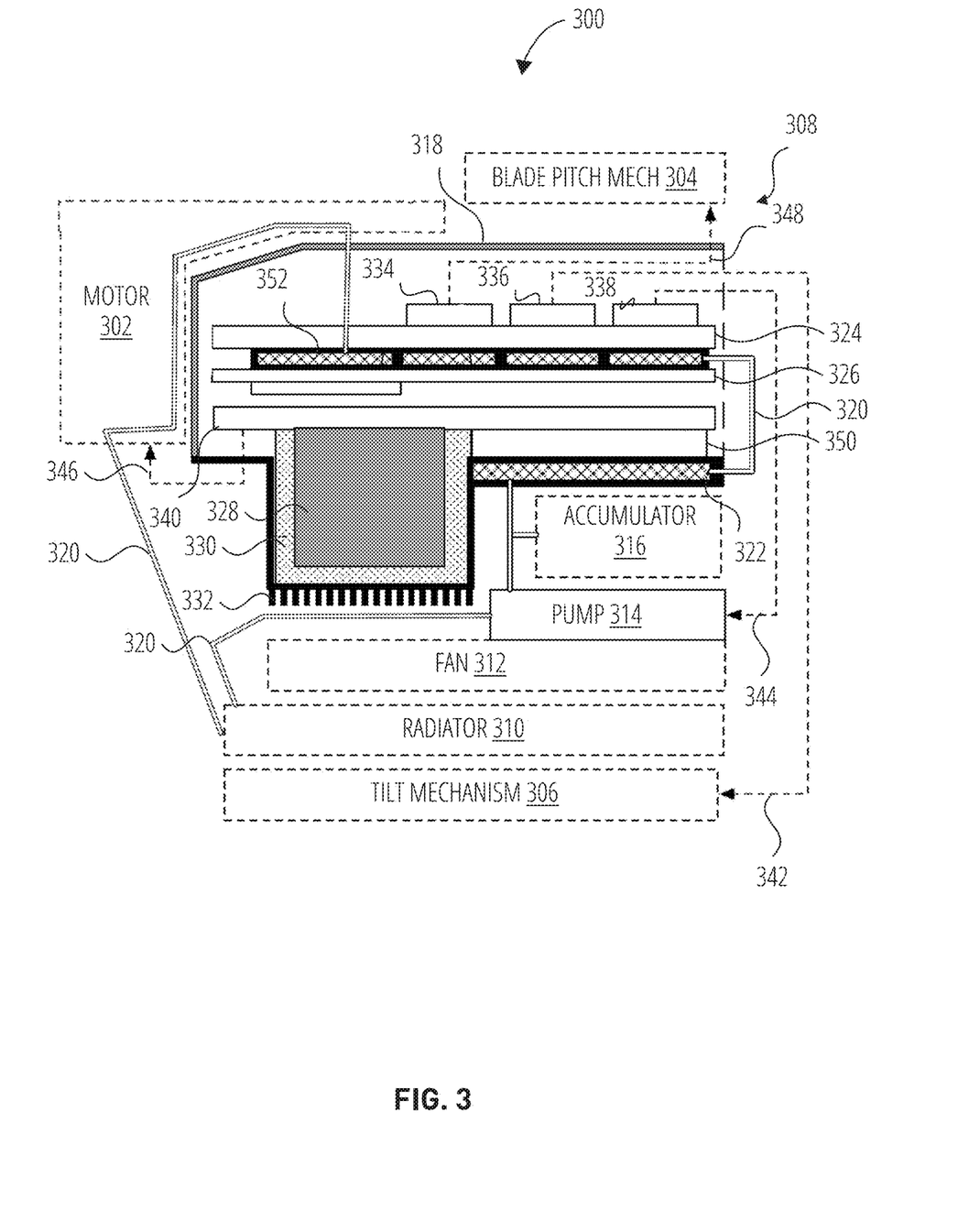
FIG. 3 illustrates part of an aircraft propulsion system 300 for use in the aircraft 100 of FIG. 1, according to some examples.

FIG. 3 illustrates part of an aircraft propulsion system 300 for use in the aircraft 100 of FIG. 1, according to some examples. The aircraft propulsion system 300 includes a motor 302 and one or more accessory units used in conjunction with the motor 302 for operation of the aircraft propulsion system 300, the accessory units may for example include a blade pitching mechanism 304, a tilt mechanism 306, and an inverter system 308. More particularly, shown in FIG. 3 is a cross section through one half of the inverter system 308—see further FIG. 4 for a cross section through both halves of the inverter system 308.

The accessory units or systems used in conjunction with operation of the aircraft propulsion system 300 can also include a radiator 310, a fan 312, a pump 314, and an accumulator 316, which together form a cooling system for the aircraft propulsion system 300. The cooling system components are connected to each other and to a number of cold plates 322 via a coolant path 320.

The inverter system 308 includes an inverter board 324, a control board 326 and a motor inverter board 340 mounted within an inverter housing 318. The motor inverter board 340 including an inverter 350 for supplying electrical power to the motor 302. The inverter board 324 includes a plurality of inverters, for example an inverter 334 coupled to the blade pitching mechanism 304 by an electrical connection 348, an inverter 336 coupled to the tilt mechanism 306 by an electrical connection 342, and an inverter 338 coupled to the integrated pump 314 and fan 312 by an electrical connection 344. The motor 302 is coupled to the inverter 350 by an electrical connection 346.

The inverter system 308 functions to condition power supplied to the motor 302, blade pitching mechanism 304, tilt mechanism 306, fan 312, pump 314 to control their operation. More specifically, the inverter system 308 functions to control the frequency and/or voltage of power supplied to, in some examples, alternating current (AC) motors in each accessory unit, to control the rotational speed, displacement and/or torque of the particular accessory unit.

In some examples, the motor 302 is connected to a rotor 120 of the aircraft 100 or is integrated into the hub of a rotor 120. The motor 302 can be an in-runner motor, outrunner motor, and/or any other suitable type of motor. Preferably, the motor 302 is a large diameter motor and/or a motor designed and configured (such as with gearing) to provide high-torque and low-speed for the propeller. The motor 302 can have any suitable power capabilities and/or requirements. Preferably, the motor 302 is a 3-phase motor, and more preferably is wound as two independent 3-phase motors for redundancy and performance. The motor 302 can have a power threshold (e.g., peak power, maximum continuous power, nominal power, max power of individual set of windings of dual-wound motor, etc.) of: less than 80 kW, 500 kW, greater than 500 kW, any range bounded by the aforementioned values, and/or any other suitable power characteristics. In a specific example, the motor 302 can turn the rotor 120 at a top speed of: less than 100 RPM, 100 RPM, less than 5000 RPM, 5000 RPM, greater than 5000 RPM, any range bounded by the aforementioned values, and/or any appropriate speed, and can operate with a maximum torque of: less than 10 N-m, 50 N-m, 5000 N-m, greater than 5000 N-m, any range bounded by the aforementioned values, and/or any appropriate maximum torque.

The inverter 336 is configured to supply conditioned power to the tilt mechanism 306, which functions to pivot and/or translate the motor 302 between a forward configuration and a hover or vertical flight configuration in some examples. The tilt mechanism 306 can connect to a rear/inboard portion of the motor 302 (and/or an inverter mounted thereto) or a forward/inboard portion of the motor 302 and couples the motor 302 to the airframe of the aircraft as shown in more detail in FIGS. 9A to 9C and FIGS. 10A to 10C.

The inverter housing 318 functions to enclose and/or structurally support the control board 326, inverter board 324 and inverter board 340. The inverter housing 318 can additionally or alternatively function to form a portion of the cooling system, can mount a pump 314 and/or fan 312 of the cooling subsystem, function as an EMI shield, and/or perform other functionalities. The inverter housing 318 is preferably configured to nest within and/or mount to a portion (e.g., rearward portion in a forward configuration) of the motor 302, but can be otherwise configured.

Figure 4:
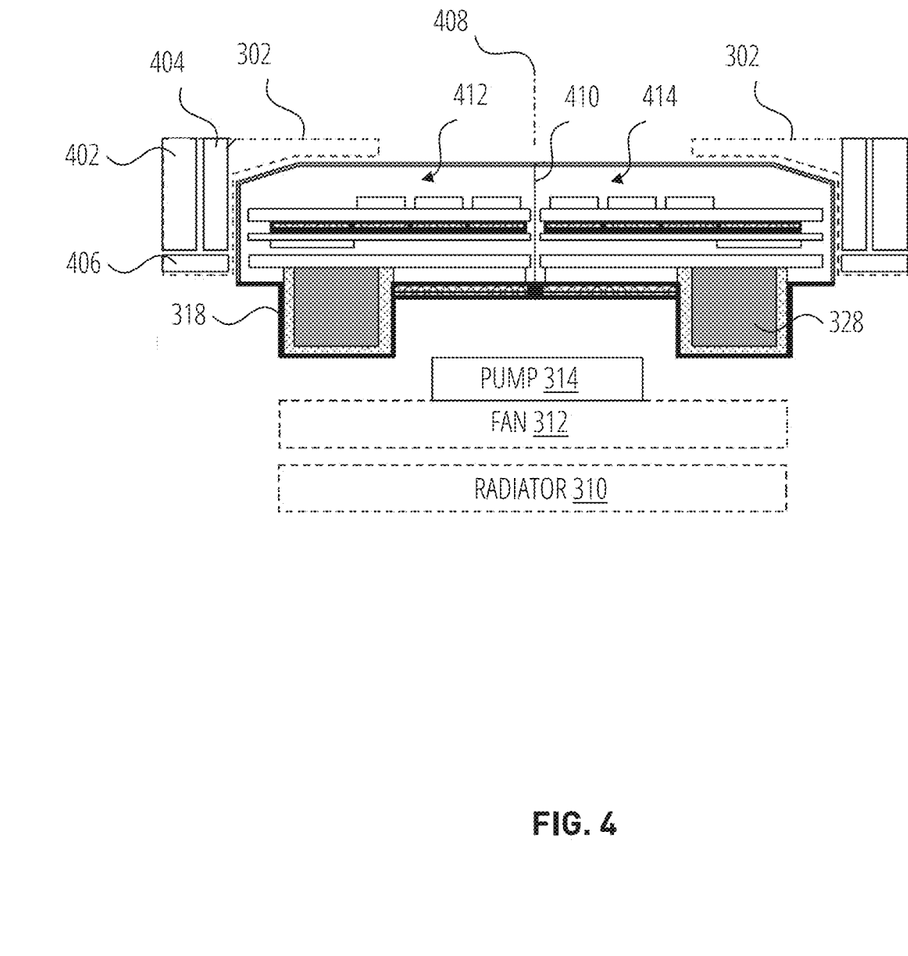
FIG. 4 further illustrates part of an aircraft propulsion system of FIG. 3 according to some examples.

The inverter housing 318 can include integrated elements that function as part of the cooling subsystem and/or function to transfer thermal energy from the inverter housing 318 to a working fluid (such as air or a liquid coolant). The inverter housing 318 can include an integrated cold plate 322 that closes out a base and/or broad face of the inverter housing 318. The inverter housing 318 can also include thermal cooling fins 332 extending from a periphery of the inverter housing 318. In some examples as shown in FIG. 3 and FIG. 4, a baseplate of the inverter housing 318 includes a cold plate 322 having a set of internal cooling channels and a plurality of cooling fins 332 at a rearward portion of the inverter housing 318 exterior (e.g., rearwardly-facing when the aircraft propulsion system 300 is in the forward configuration).

The control board 326 functions to receive commands (e.g., from a flight processor or FMS) and control operation of the inverter boards based on the received commands. The control board 326 can additionally function to monitor various sensors and/or control the various accessory units or actuators based on sensor feedback, and interface with the onboard flight management system (FMS). The control board 326 can be configured to provide field-oriented control (FOC) or vector control, but can additionally or alternatively be configured to provide direct torque control (DTC), scalar control (e.g., by pulse-width modulation; for a low-power actuator such as a fan; etc.), and/or be configured to provide any suitable control for any suitable actuators. There is preferably one control board 326 arranged within each distinct coolant volume and/or subregion of the inverter housing 318, which is electrically connected to and/or controls each inverter within the respective coolant volume (subregion) of the inverter housing 318. However, there can additionally or alternatively be a single control board 326 connected to and/or controlling all inverters within the inverter housing, or more than one control board within each coolant volume. The control board 326 is preferably a printed circuit board (PCB), but can be otherwise suitably implemented. The control board can include: a processor card and gate drive circuitry; however, the control board can additionally or alternatively include any other suitable components.

The inverter board 324 and the inverter board 340 function to condition power supplied to actuators such as the motor 302, blade pitching mechanism 304, tilt mechanism 306, fan 312, pump 314 to control their actuation according to the signals from the control board 326. More specifically, the inverter boards convert DC power (e.g., from an onboard power source, such a battery pack 202) into phased outputs of a specific frequency and/or voltage (e.g., to be supplied to AC actuators to control the rotational speed and/or torque). The inverter boards each include one or more inverter circuits (hereinafter "inverters"), associated with a set of windings of a respective actuator of the set. The inverters include any suitable arrangement, combination, and/or permutation of transformers, resistors, transistors (e.g., MOSFETs), capacitors (e.g., decoupling DC-link capacitors), and/or any other suitable electrical components interconnected to form an electrical circuit specified according to the power requirements of the respective actuator.

The set of inverter boards preferably includes a primary (e.g., high-power) inverter board 340 including the inverter circuitry for the highest power actuator of the actuator set (e.g., motor 302) and a secondary (e.g., low-power) inverter board 324 including the inverters for the remaining actuators of the actuator set. The power requirements for the high-power inverter board 340 (and the associated highest power actuator) can exceed the collective power requirements of the remaining actuators of the actuator set, such that the maximum power output of the primary inverter board 340 is greater than a maximum power output of the secondary inverter board 324 (e.g., by less than 0.5, 3, 5, greater than 5, any proportion therebetween, and/or any other suitable value). However, the inverter boards can additionally or alternatively include a single board housing all inverters, a plurality of secondary (low-power) boards, and/or inverters can be otherwise distributed between any suitable set of inverter boards.

The inverter board 324, inverter board 340 and the control board 326 are preferably arranged in a 'stacked' configuration, but can be otherwise suitably arranged parallel to the broad face(s)/baseplate of the inverter housing, normal to the motor's rotational axis 408, perpendicular to the firewall 410, and/or otherwise suitably arranged. The control board 326 is preferably arranged between the primary inverter board 340 and the secondary inverter board 324, but can additionally or alternatively be arranged opposite the primary inverter board 340 across a thickness of the secondary inverter board 324, and/or otherwise suitably arranged. The set of inverter boards and/or control boards can be distributed in any suitable manner. Low-voltage power and/or data—such as sensor and control signals—can be routed between the control board and the inverter boards using flexible printed circuits. Conversely, power connections between the inverters and the actuators are preferably formed by bus bar connections and/or rigid electrical connections (e.g., orthogonal to the broad faces of the stacked boards). However, power and/or data connections can be otherwise suitably routed between the inverter and/or control boards.

Coupled to the inverter board 340 are DC link capacitors 328. The DC link capacitors 328 form a load-balancing energy storage device, which helps protect the inverter network from momentary voltage spikes, surges and EMI. DC link capacitors 328 capacitors can be ceramic, film, and/or a mixture thereof. The DC link capacitors 328 can be arranged along a rearward side of the inverter board 340 and/or adjacent to a baseplate of the inverter housing 318. In a second example, DC link capacitors 328 can be arranged distal the firewall and/or along a periphery of the inverter. The DC link capacitors 328 may be enclosed in thermally-conductive epoxy 330, which serves to transfer heat from the DC link capacitors 328 to the cooling fins 332 and cold plate 322.

The cold plates 322 and cold plates 352 function to remove thermal energy from heat-generating components of the control board 326 and/or inverter board 324 and inverter board 340, as well as the DC link capacitors 328. The aircraft propulsion system 300 can include separate cold plates arranged within each distinct coolant volume of the housing (e.g., one on each side of the firewall 410 as shown in FIG. 4) and paired with (thermally coupled to) a single multi-inverter and/or cold plates thermally coupled to a plurality of multi-inverters. A multi-inverter is a single inverter that conditions power for multiple actuators. There can be a single cold plate thermally within each multi-inverter, multiple cold plates within each multi-inverter, a single cold plate thermally coupled to a plurality of multi-inverters, and/or any suitable number of cold plates within the system.

In some examples, the set of cold plates includes a primary cold plate 322 that is thermally coupled to a heat generating region of the primary inverter board 340, and one or more secondary cold plates 352 that are thermally coupled to the control board 326 and/or secondary inverter board 324. In a first example, the primary cold plate 322 is arranged between the primary inverter board 340 and the inverter housing 318 (and/or integrated into the inverter housing 318). In a second example, the one or more secondary cold plates 352 are arranged between and thermally coupled to the secondary inverter board 324 and control board 326 (e.g., the processor card). In the second example, the projected areas of each heat generating region (from the secondary inverter board 324 and control board 326) onto a broad face of the one or more secondary cold plates 352 can be non-overlapping or overlapping. However, the secondary one or more secondary cold plates 352 can be otherwise arranged relative to the control board 326 and/or processing boards (and heat generating regions thereon). In some examples, cold plates can be integrated into the body of the inverter housing 318 and/or form a baseplate of the inverter housing 318 that closes out the distinct coolant volumes (e.g., at a rear end). In such examples, a single cold plate can include an interior volume which extends across the heat generating regions and/or broad face of an inverter board (and/or control board) of a plurality of multi-inverters and is thermally connected to both multi-inverters. In such examples, the cold plate can cool redundant multi-inverters via parallel coolant flow paths, but can additionally or alternatively cool the multi-inverters in any suitable combination/permutation of series and parallel coolant flows. Alternatively, a single cold plate can be thermally connected to a plurality of multi-inverters with a plurality of fluid channels (e.g., mechanically isolated, forming parallel coolant flow paths).

Coolant routing components forming the coolant path 320 function to direct circulation of coolant (e.g., water/glycol mixture, transformer oils, etc.) through or adjacent to or around the cold plate 322 and cold plates 352 and to connect the cold plates to a remainder of the cooling system (i.e. forming a cooling loop). Coolant routing components can include any fluid manifolds, hoses, tubes, pipes, channels within the housing of the inverter, channels within the body of the motor, and/or any other suitable coolant routing components. Preferably, the coolant path 320 fluidly connects the primary cold plate 322 to the secondary cold plates 322 in series (e.g., within a multi-inverter/within a subregion). The coolant path 320 can form a single fluid loop (e.g., all components in series, multiple sections of parallel fluid flow all converging to pass through a section of the loop, etc.) or multiple, parallel fluid loops. However, the coolant path 320 can interconnect the various cooling components of the cooling system in any suitable combination and/or permutation of series/parallel coolant flow. Coolant routing components can pass through orifices in the thickness of the inverter boards (e.g., via a fluid manifold or other fluid routing) and/or be routed around the boards. Coolant routing components can include a first coolant routing termination at a rearward end of the inverter housing 318

(e.g., proximal the mounting side, proximal the pump/radiator; coolant inlet) and a second coolant routing termination (e.g., outlet) at a forward end of the inverter housing 318. The second coolant routing termination is preferably connected to the motor 302 and the first coolant routing termination is preferably connected to the pump 314, however the coolant path 320 can otherwise interconnect the various components of the cooling system.

The coolant path 320 components can optionally direct coolant flow through a radiator 310, which functions to reject heat from the coolant to the ambient environment. In some examples, the radiator 310 can abut and/or nest adjacent to the tilt mechanism 306 such that external airflow through the radiator 310 (e.g., ducted flow by way of the fan 312) is partially and/or fully obstructed (e.g., in the direction of flow, lengthwise along the motor's rotational axis 408, etc.) in one or more configurations of the tilt mechanism 306. In particular, tightly nesting the radiator 310 and the tilt mechanism 306 and/or directly obstructing the airflow through the radiator 310 can increase packaging density and aerodynamic efficiency during forward flight, where the power requirements of the motor 302 and inverter board 340 are reduced (and, by extension, the necessary heat rejection from the aircraft propulsion system 300). Likewise, displacing the radiator 310 with the motor 302 and inverter housing 318 during transformation of the tilt mechanism 306 during transition and/or in hover configurations can increase the airflow and/or thermal rejection achieved by the radiator 310 when the thermal loads are greatest as a result of power and/or heat rejection requirements being largest. See further FIG. 9A to FIG. 9C and FIG. 10A to FIG. 10C. In such cases, the heat rejection during hover or vertical flight can be effectively doubled by the radiator 310 moving with the motor 302 to increase airflow through the radiator 310. However, the system can include any other suitable radiator 310 and/or otherwise suitably route coolant through a radiator 310. Alternatively, the system can reject heat by way of a refrigeration system and/or other sub-ambient cooling architecture.

In some examples, coolant routing components can fully fluidly enclose and contain coolant, without pressure exchange with the environment. In such examples, coolant routing components can direct coolant through an accumulator 316, which can regulate the fluid pressure and prevent over-pressurization. Alternatively, the coolant path 320 can include passive coolant venting to the ambient environment and/or any other suitable pressure equilibration mechanisms to prevent gas buildup within the cooling subsystem.

The pump 314 functions to circulate coolant along the coolant path 320 and through the coolant routing components, cold plates, and/or actuator(s). The pump 314 can additionally or alternately function to transport coolant from the motor 302 and/or cold plates 322 to the radiator 310.

The fan 312 functions to circulate ambient air across the cooling fins 332 of the inverter housing 318 and/or through the radiator 310. In some examples, the fan 312 can be mechanically connected to a rotating shaft of the pump 314 and/or otherwise mechanically integrated with or into the pump 314. The fan 312 can be directly tied to the pump 314 and configured to rotate at an angular rate proportional to that of the pump shaft (e.g., equivalent angular rate when ungeared). The fan 312 can be ducted and/or non-ducted and/or otherwise suitably implemented. Additionally or alternatively, the fan 312 can be separate from the pump 314 (e.g., integrated into a radiator assembly, etc.), and/or separately powered.

The aircraft propulsion system 300 can optionally include sensors that function to monitor the operation of the system. Sensors can include: temperature sensors (e.g., thermistors, thermocouples, etc.), inertial sensors (e.g., accelerometers, gyroscopes, IMUs, etc.), impedance sensors, hall-effect sensors, flow sensors (e.g., flow rate sensors, fluid pressure sensors, etc.), and/or any other suitable sensors. In some examples, temperature sensors can be used to monitor the temperature of motor windings, bearings, coolant, and/or any other suitable components. In some examples, flow sensors can monitor coolant pressure and/or flow rate in the coolant subsystem. However, the system can include any other suitable sensors. Sensors are preferably communicatively connected to the control board 326 and can be employed in conjunction with various actuation control schemes (e.g., feed-forward, feedback, etc.). However, in some examples it can be advantageous for sensor inputs to be received at an outboard inverter board (e.g., leading inverter board 324 of the stack in the forward configuration; secondary/triple-inverter board). In such some examples, sensor inputs can be received at a section of the inverter board 324 that is electrically isolated from the inverters and relayed to the control board 326 (or FMS). Accordingly, the control board 326 can be considered to be 'indirectly' connected to various sensors of the aircraft propulsion system 300 and/or indirectly connected by way of an inverter board 324.

Coolant routing is preferably provided with a substantially uniform (e.g., varying by less than 10%, 20%, 50%, exactly uniform, etc.) and/or constant cross-sectional area across various portions of the coolant flow path. Coolant is preferably circulated through the coolant routing components at a high flow rate (e.g., such that coolant temperature rise through the motor can be neglected in some cases; where coolant temperature rises less than 5 deg C. through the motor 302 and/or inverter housing 318; etc.).

In some examples, coolant in the coolant path 320 from the radiator 310 enters the motor 302 at the stator 404 and passes through or between field coils in the stator 404, and then through the electrical bussing 406. The coolant in the coolant path 320 then proceeds into the inverter housing 318 and through the cold plates 352 and cold plates 322 before returning to the pump 314, and from there back to the radiator 310. The coolant path thus provides an integrated cooling system that not only cools the motor 302 but also the inverters for a plurality of the actuators associated with the aircraft 100. The direction of flow and the sequence of components in the cooling path can of course be varied or reversed.

By packaging the inverters outboard of an actuation mechanism (e.g., tilt mechanism 906), the complexity of cable routing to actuators outboard of the actuation mechanism (e.g., pump/fan, motor, blade pitch mechanism, etc.) can be reduced.

FIG. 4 further illustrates part of an aircraft propulsion system 300 of FIG. 3 according to some examples. More particularly, shown in FIG. 4 is a cross section through both halves of the inverter system 308 shown in FIG. 3. In some examples, the inverter housing 318 is configured to extend within a radial interior of the motor 302, with the stator 404 and/or rotor 402 of the motor 302 arranged radially outward (relative to the motor's rotational axis 408) of a portion of the inverter housing 318. In such examples, the inverter housing 318 can extend radially inward of a plurality of permanent magnets or the stator 404 of the motor 302. An outer periphery of the inverter housing 318 can be arranged flush with a radial inner periphery of the motor 302 and/or inset from the radial periphery of the motor 302, but can be otherwise suitably configured. More preferably, the inverter housing 318 can be radially inset from the electrical bussing 406 of the motor 302 (e.g., bus rings) and/or circumscribed by the housing of the stator 404. However, the inverter housing 318 can be otherwise suitably arranged relative to the motor. The inverter housing 318 can include electrical bus terminals, coolant channels/orifices, thermal fins, and/or any other suitable features in any suitable arrangement. The inverter housing 318 is preferably formed from a metal with high thermal conductivity (e.g., aluminum), but can additionally or alternatively include thermal insulation, electrical isolation, plastics, composites, ferrous metals (e.g., iron), steel, copper, and/or any other suitable materials.

The inverter housing 318 can include a firewall 410, which functions to subdivide an interior of the inverter housing into a plurality (e.g., two) of distinct coolant volumes (e.g., fluidly isolated first volume 412 and second volume 414) and/or to prevent propagation of thermal events between opposing portions of the interior of the inverter housing 318 (e.g., between redundant or secondary isolated volumes within the housing). The firewall 410 preferably extends through an interior of the inverter housing 318 between the broad upper and lower faces (e.g., perpendicular to the upper and lower faces of the inverter housing 318 shown in FIG. 4), however it can be otherwise suitably arranged). The firewall 410 can be arranged along a sagittal plane relative to the motor's rotational axis 408 and/or extend axially and radially relative to the rotational axis 408, but can additionally or alternatively be otherwise suitably arranged. The coolant volumes defined by the firewall 410 within the inverter housing 318 are preferably symmetric and/or of substantially equal volume, but the firewall 410 can otherwise suitably divide the inverter housing. The firewall 410 can be formed from the same material as the housing exterior (e.g., aluminum, steel, etc.) and/or any other suitable materials.

The inverter system 308 can include redundant instance(s) of the control board 326 and/or the inverter board 324 and inverter board 340, each associated with a distinct coolant volume. However, electronics can also be shared across distinct coolant volumes of the inverter housing 318. The electronics within a common distinct coolant volume are preferably connected together and cooperatively form a single inverter (e.g., a multi-inverter conditioning power for multiple actuators), but can alternatively be disconnected or otherwise configured. Accordingly, where the set inverter boards can be taken as a 'multi-inverter' (e.g., quad inverter) which can separately actuate each the set of actuators, the housing can include a plurality of said multi-inverters, which can be thermally, mechanically, and/or electrically isolated on opposing sides of the firewall 410. In a specific example, the firewall can subdivide the inverter housing into two distinct portions, such as first volume 412 and second volume 414, each volume including a control board 326 and two inverter boards, inverter board 324 and inverter board 340, which cooperatively form a quad inverter. In some examples, the two quad inverters can cooperatively and/or independently actuate a set of four actuators. Accordingly, the inverter housing 318 may include two (redundant) quad inverters for a total of eight inverters commonly packaged within (and/or cooled by) the inverter housing 318.

Examples of this technology can thus provide dual redundancy within a single inverter system and/or within a single inverter housing 318 when coupled with two independent 3 phase motors mechanically coupled together within a single electric propulsion system. Such examples can utilize dual wound actuators, duplicative inverter and/or control boards, separate cooling components, and/or provide any other suitable redundancies. Such examples can likewise subdivide the inverter housing 318 into distinct coolant volumes (e.g., using a firewall 410) to mitigate the propagation of any thermal events between redundant inverters.

Figure 5:
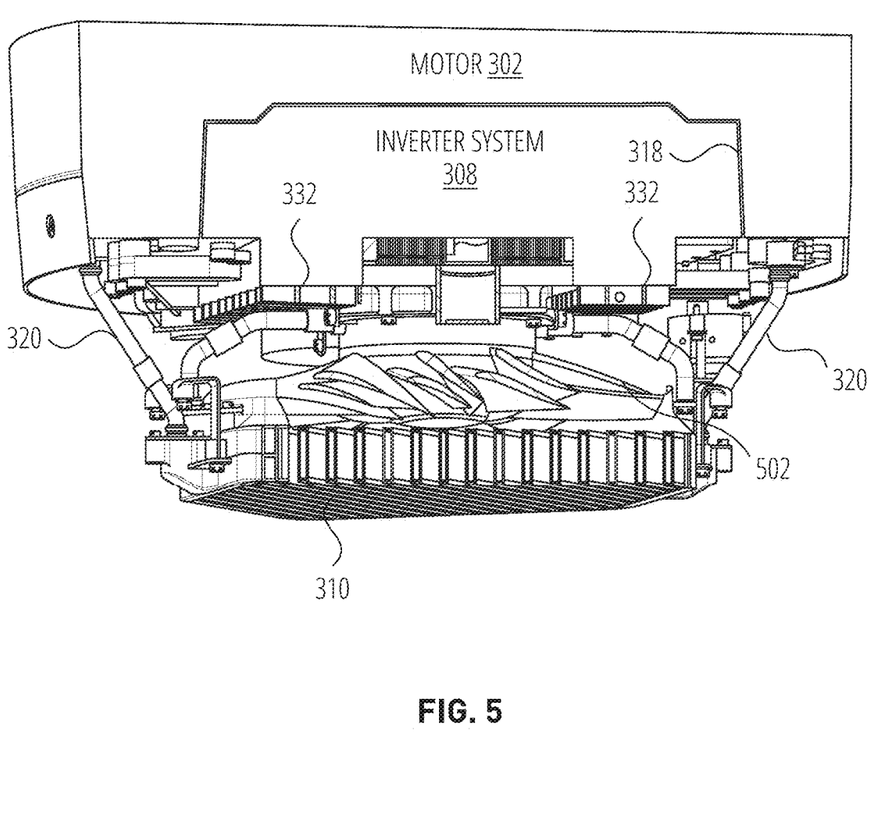
FIG. 5 illustrates a partial cross section through the aircraft propulsion system of FIG. 3 and FIG. 4 according to some examples.

FIG. 5 illustrates a partial cross section through the aircraft propulsion system 300 of FIG. 3 and FIG. 4 according to some examples. In particular and as discussed above with reference to FIG. 4, the inverter housing 318 is nested within a radial interior of the motor 302, with the stator 404 and/or rotor 402 of the motor 302 arranged radially outward (relative to the motor's rotational axis 408) of a portion of the inverter housing 318. Also shown in FIG. 5 are the cooling fins 332 for the DC link capacitors 328, an integrated pump/fan 502, the radiator 310 and some of the conduits forming the coolant path 320.

This configuration provides high power-density inverter packaging, by efficiently routing power and/or cooling through the inverter/control boards. In some examples, the system improves the packaging efficiency of a brushless DC motor (e.g., inverter packaged within a motor) by packaging one or more inverter boards within an interior of the stator and/or rotor. Likewise, this configuration can improve power density by tightly integrating the cooling subsystem within or partly within the motor 302 and/or inverter housing 318.

Figure 6:
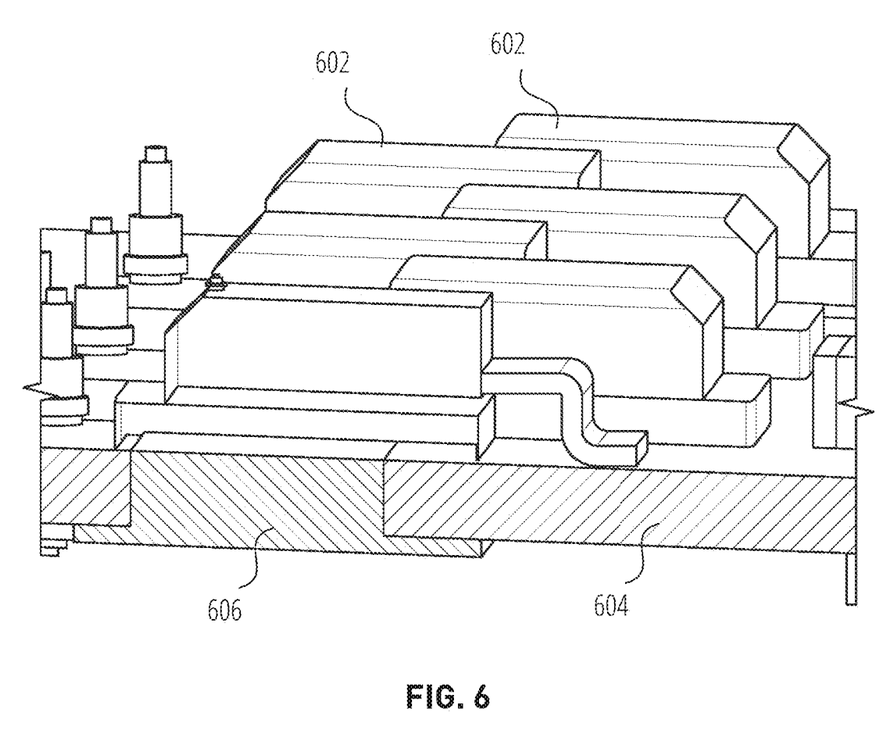
FIG. 6 shows an inverter board used in an aircraft propulsion system according to some examples.

FIG. 6 shows an inverter board 604 used in the aircraft propulsion system 300 according to some examples. The inverter board 604 includes a plurality of heat-generating components 602. In some examples, these are SiC switches that comprise the inverter 334, the inverter 336 and inverter 338 on inverter board 324. The heat-generating components 602 of the inverter board 604 can be arranged opposite a cold plate(s) across a thickness of the inverter board 604. In such instances, the inverter board 604 can include heat transfer paths comprising thermal coins 606 of high conductivity materials, located at the base of heat generating heat-generating components 602 (and/or distributed about heat generating regions), which extend through the inverter board 604 and thermally connect one or more heat-generating components 602 to one or more cold plates such as cold plates 322.

Figure 7:
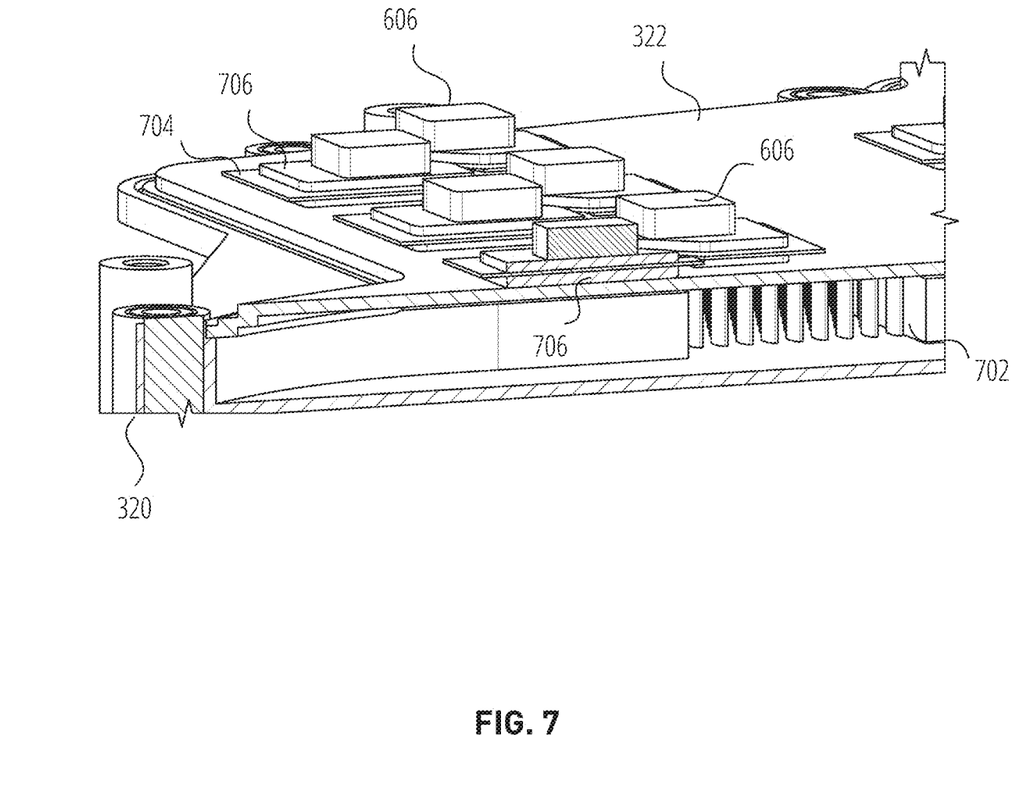
FIG. 7 illustrates the thermal interface between thermal coins of the inverter board of FIG. 6 and a cold plate according to some examples.

The thermal coins 606 function to decrease the thermal resistance through the thickness of the board. Thermal coins 606 are preferably formed from high thermal conductivity materials, such as: copper, aluminum, and/or other high thermal conductivity materials, and are preferably electrically isolated from the circuitry of the inverter board 604 to avoid shorting the board. In one example, the thermal coins 606 can include integrated electrically insulating layers, such as a ceramic layer or other electrically insulating layer (e.g., with lower thermal conductivity than the remainder of the material, with lower thermal conductivity than the board, etc.)—an example of which is shown in FIG. 7. In a second example, the thermal coins 606 can be electrically isolated with an electrically insulated coating or seal at a periphery (e.g., between an electrical component and the exposed portion of a thermal coin, between a cold plate and a thermal coin, etc.).

In some examples, the inverter board 604 can include insulation layer(s) configured to thermally insulate a component/region of an inverter board from a cold plate (e.g., thermally coupled to a different heat-generating region of the same inverter board). In one example, film capacitors are thermally insulated from the cold plate, and are cooled to ambient air, while ceramic capacitors are cooled using a liquid coolant. This can allow heat generating components with large cooling requirements such as MOSFETs (which can be capable of sustaining high temperatures well above ambient) to be separately cooled using a liquid coolant. Thermal insulation between DC-link film capacitors and the cold plate/baseplate of the housing can have a thermal conductivity that is less than the thermal conductivity of an air gap (of equivalent thickness), greater than the thermal conductivity of an air gap, and/or can have any other suitable thermal properties.

FIG. 7 illustrates the thermal interface between thermal coins 606 of the inverter board of FIG. 6 and a cold plate 322 according to some examples. A fluid channel 702 is provided adjacent to the cold plate 322, which is supplied with coolant via the coolant path 320. A thermally conductive layer 706 is provided between the thermal coins 606 and the cooling cold plate 322. A layer of electrical isolation 704 is provided to electrically isolate the thermal coins 606 from the cold plate 322 and from each other. In other examples, the thermal coins 606 can be mounted to the electrical isolation 704, which in turn is mounted to the cold plate 322

Figure 8:
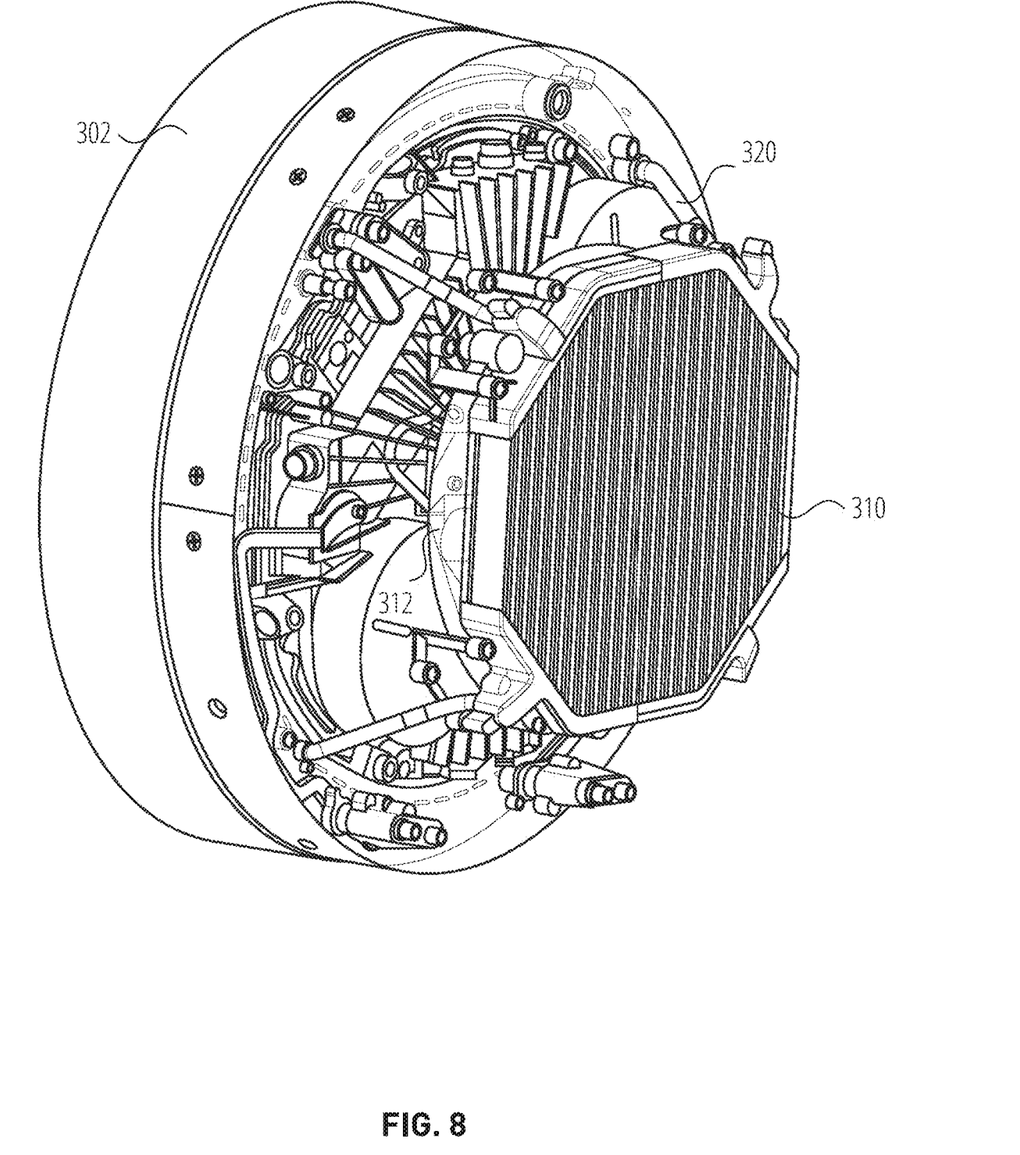
FIG. 8 illustrates a perspective view of the aircraft propulsion system of FIG. 3 and FIG. 4 according to some examples.

FIG. 8 illustrates a perspective view of the aircraft propulsion system 300 of FIG. 3 and FIG. 4 according to some examples. FIG. 8 shows the relative positioning of the motor 302, the fan 312 and the radiator 310, as well as some of the piping forming part of the coolant path 320.

Figure 9A:
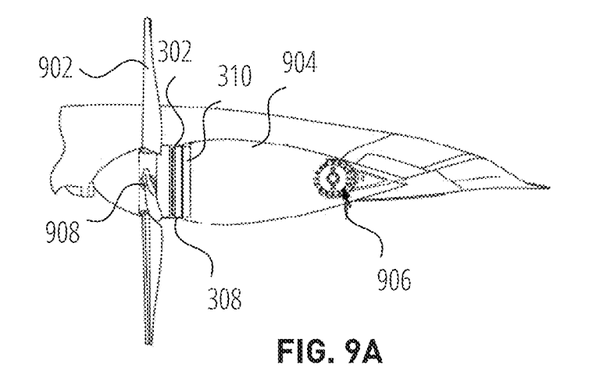
FIG. 9A, FIG. 9B and FIG. 9C illustrate the tilting of an aircraft propulsion system and related components such as a propeller and nacelle according to some examples.
Figure 9B:
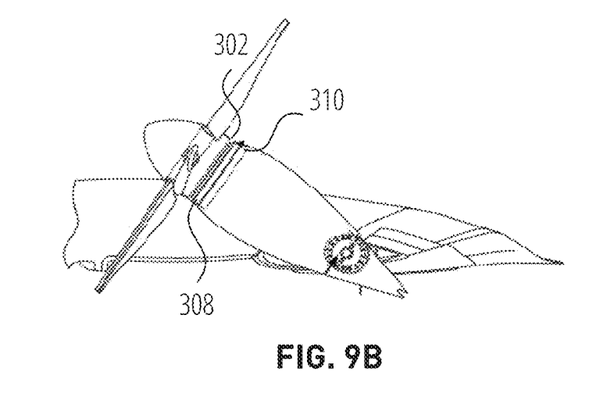
Figure 9C:
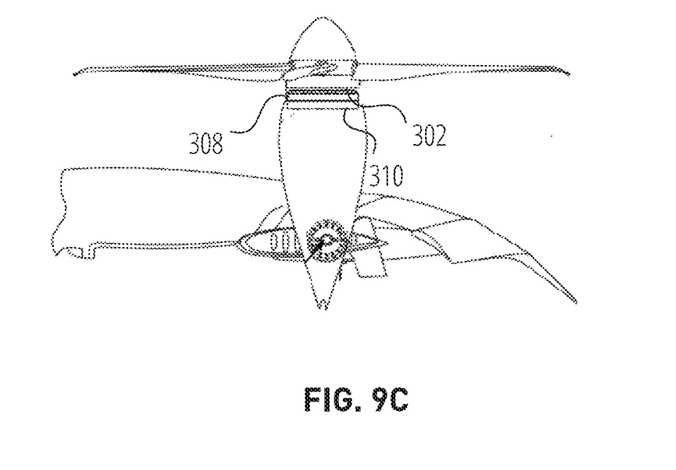

FIG. 9A, FIG. 9B and FIG. 9C illustrate the tilting of the aircraft propulsion system 300 and related components such as the propeller 902 and nacelle 904 according to some examples. The aircraft is preferably an eVTOL airplane (e.g., a multi-modal aircraft) as illustrated, but can additionally or alternatively include any suitable aircraft. The aircraft 100 is preferably a tiltrotor aircraft with a plurality of aircraft propulsion systems that are operable between a forward arrangement (FIG. 9A, and FIG. 10A) and a hover or vertical flight arrangement (FIG. 9C and FIG. 10C). However, the aircraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), a tiltwing aircraft, a wingless aircraft (e.g., a helicopter, multicopter, quadcopter), and/or any other suitable rotorcraft or vehicle propelled by propellers or rotors.

As shown in FIG. 9A to FIG. 9C, in one example a nacelle 904 including the aircraft propulsion system 300 (identified are the motor 302, the inverter system 308 and radiator 310) and a propeller 902 with a blade-pitching mechanism 908 are tilted relative to the rest of the aircraft 100 by a tilt mechanism 906 located towards the rear of the nacelle 904.

When integrated into a propulsion tilt mechanism in an aircraft configurable between a forward configuration and a hover configuration, cooling subsystems can advantageously utilize an increase in available airflow in a hover configuration as discussed below.

Figure 10A:
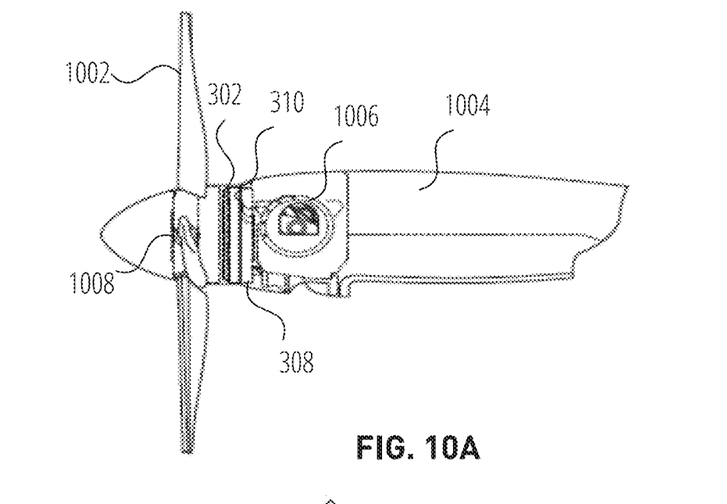
FIG. 10A, FIG. 10B and FIG. 10C illustrate the tilting of an aircraft propulsion system and related components such as a propeller and nacelle according to some examples.
Figure 10B:
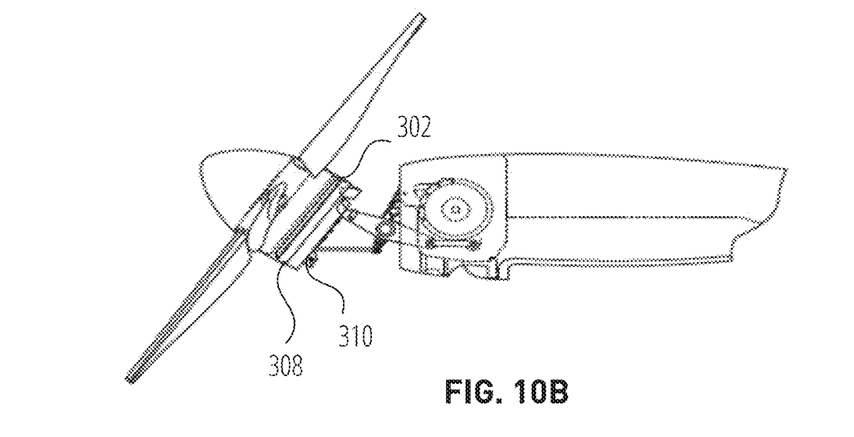
Figure 10C:
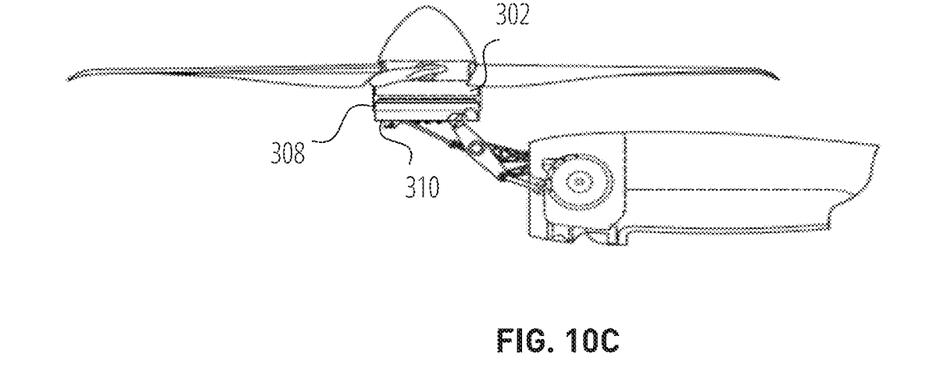

FIG. 10A, FIG. 10B and FIG. 10C illustrate the tilting of the aircraft propulsion system 300 and related components such as the propeller 902 relative to a nacelle 1004 according to some examples. As can be seen in FIG. 10B and FIG. 10C, in this example the aircraft propulsion system 300 (identified are the motor 302, the inverter system 308 and radiator 310) and a propeller 1002 with a blade-pitching mechanism 1008 are tilted relative to the nacelle 1004 by a tilt mechanism 1006 located towards the front of the nacelle 1004.

As can be seen in FIG. 10C, which is a hovering configuration, the radiator 310 is exposed to the open air as opposed to being contained within the nacelle 1004 as in the vertical configuration. This results in more airflow through the radiator 310 both from the fan 312 and as a result of adjacent airflow from the propeller 902. Since hovering has a higher power requirement than level flight, the additional cooling provided by the increased airflow through the radiator 310 can be advantageous.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The term "rotor" as utilized herein when referring to a thrust-generating element, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The term "board" as utilized herein, in reference to the control board, inverter board, or otherwise, preferably refers to a circuit board. More preferably, "board" refers to a printed circuit board (PCB) and/or electronic components assembled thereon, which can collectively form a printed circuit board assembly (PCBA). In a first example, the control board is a PCBA. In a second example, each inverter board is a PCBA. However, "board" can additionally or alternatively refer to a single sided PCB, double sided PCB, multi-layer PCB, rigid PCB, flexible PCB, and/or can have any other suitable meaning.

The aircraft can include any suitable form of power storage or power storage unit (battery, flywheel, ultracapacitor, battery, fuel tank, etc.) which powers the actuator (s) (e.g., rotor/propeller, tilt mechanism, blade pitch mechanism, cooling systems, etc.). The preferred power/fuel source is a battery, however the system could reasonably be employed with any suitable power/fuel source. The aircraft can include auxiliary and/or redundant power sources (e.g., backup batteries, multiple batteries) or exclude redundant power sources. The aircraft can employ batteries with any suitable cell chemistries (e.g., Li-ion, nickel cadmium, etc.) in any suitable electrical architecture or configuration (e.g., multiple packs, bricks, modules, cells, etc.; in any combination of series and/or parallel architecture).

In a specific example, the system integrated into an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

The term "substantially" as utilized herein can mean: exactly, approximately, within a predetermined threshold or tolerance, and/or have any other suitable meaning.

Alternative embodiments implement the above methods and/or processing modules m non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention without departing from the scope of this invention defined in the following claims.

The invention claimed is:

1. An aircraft propulsion unit, comprising:
   an electric motor;
   at least one accessory unit used for operating the electric motor, the at least one accessory unit comprising a tilt mechanism for tilting the aircraft propulsion unit between a vertical flight configuration and a horizontal flight configuration;
   an inverter module, the inverter module including a plurality of inverters for powering the electric motor and the at least one accessory unit; and
   a cooling system coupled to the electric motor and the inverter module, the cooling system comprising a coolant path for circulating a coolant through or adjacent to the electric motor and the inverter module.

2. The aircraft propulsion unit of claim 1 wherein the inverter module is at least partly nested in the electric motor.

3. The aircraft propulsion unit of claim 1 wherein the inverter module comprises one or more cold plates for transferring heat from the plurality of inverters to the coolant in the coolant path.

4. The aircraft propulsion unit of claim 1 wherein the at least one accessory unit comprises a pump for circulating the coolant through the coolant path.

5. The aircraft propulsion unit of claim 4 wherein the cooling system includes a radiator and the pump includes a fan for blowing air through the radiator.

6. The aircraft propulsion unit claim 1 wherein the cooling system includes a radiator, airflow through the radiator being greater in use when the aircraft propulsion unit is in the vertical flight configuration than when the aircraft propulsion unit is in the horizontal flight configuration.

7. The aircraft propulsion unit of claim 1 wherein the at least one accessory unit comprises a blade pitching mechanism to adjust the pitch of a rotor blade.

8. The aircraft propulsion unit of claim 1 wherein the inverter module includes an inverter module housing, the inverter module housing including cooling fins for transferring heat from the inverter module.

9. The aircraft propulsion unit of claim 1 wherein the inverter module comprises an inverter module housing, the inverter module housing including a first region and a second region that is separated from the second region, the first region and the second region including redundant inverters.

10. The aircraft propulsion unit of claim 9 wherein the first and second regions are separated by a firewall.

11. The aircraft propulsion unit of claim 1 wherein the motor comprises a stator and a rotor arranged around an axis of rotation of the motor, the inverter module being located inward of the stator and the rotor, wherein the inverter module comprises a plurality of circuit boards, the plurality of circuit boards being in a stacked configuration perpendicular to the axis of rotation of the motor.

12. An aircraft, comprising:
    a fuselage;
    one or more thrust-generating units; and
    one or more propulsion units for driving the thrust-generating units, each propulsion unit comprising:
    an electric motor;
    at least one accessory unit used for operating the electric motor, the at least one accessory unit comprising a tilt mechanism for tilting the aircraft propulsion unit between a vertical flight configuration and a horizontal flight configuration;
    an inverter module, the inverter module including a plurality of inverters for powering the electric motor and the at least one accessory unit; and
    a cooling system coupled to the electric motor and the inverter module, the cooling system comprising a coolant path for circulating a coolant through or adjacent to the electric motor and the inverter module, the cooling system further including a radiator, airflow through the radiator being greater in use when the aircraft propulsion unit is in the vertical flight configuration than when the aircraft propulsion unit is in the horizontal flight configuration.

13. The aircraft of claim 12 wherein the inverter module is at least partly nested in the electric motor.

14. The aircraft of claim 12 wherein the at least one accessory unit comprises a blade pitching mechanism to adjust the pitch of a rotor blade.

15. The aircraft of claim 12 wherein the inverter module comprises an inverter module housing, the inverter module housing including a first region and a second region that is separated from the second region, the first region and the second region including redundant inverters.

16. A method of cooling an aircraft propulsion unit comprising an electric motor, at least one accessory unit used for operating the electric motor, and an inverter module, the inverter module including a housing and plurality of inverters for powering the electric motor and the at least one accessory unit, the method comprising:
    circulating a coolant through a coolant path defined in the electric motor;

circulating the coolant through the housing of the inverter module;

circulating the coolant through a heat exchanger; and tilting the aircraft propulsion unit between a horizontal flight configuration and a vertical flight configuration such that airflow through the heat exchanger is increased in the vertical flight configuration.

17. The method of claim 16 wherein the inverter module comprises one or more cold plates for transferring heat from the plurality of inverters to the coolant in the coolant path, the method further comprising circulating the coolant past the one or more cold plates.

* * * * *

UNITED STATES PATENT AND TRADEMARK OFFICE
CERTIFICATE OF CORRECTION

PATENT NO. : 11,560,235 B2
APPLICATION NO. : 17/650458
DATED : January 24, 2023
INVENTOR(S) : Wagner et al.

It is certified that error appears in the above-identified patent and that said Letters Patent is hereby corrected as shown below:

In the Claims

In Column 13, Line 66, in Claim 6, after "unit", insert --of--

Signed and Sealed this
Sixth Day of February, 2024

Katherine Kelly Vidal
*Director of the United States Patent and Trademark Office*